United States Patent
Jackson

(10) Patent No.: US 10,231,535 B2
(45) Date of Patent: *Mar. 19, 2019

(54) MAGNETIC POCKET RETAINER

(71) Applicant: Arthur E. Jackson, New Haven, CT (US)

(72) Inventor: Arthur E. Jackson, New Haven, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/910,626

(22) Filed: Mar. 2, 2018

(65) Prior Publication Data

US 2018/0184792 A1 Jul. 5, 2018

Related U.S. Application Data

(63) Continuation of application No. 15/391,770, filed on Dec. 27, 2016, now Pat. No. 9,924,787.

(60) Provisional application No. 62/272,048, filed on Dec. 28, 2015.

(51) Int. Cl.
| | |
|---|---|
| *H04M 1/00* | (2006.01) |
| *A45F 5/02* | (2006.01) |
| *H04B 1/3827* | (2015.01) |
| *A41F 1/00* | (2006.01) |
| *A45C 13/10* | (2006.01) |

(52) U.S. Cl.
CPC ............. *A45F 5/022* (2013.01); *A41F 1/002* (2013.01); *A45C 13/1069* (2013.01); *H04B 1/385* (2013.01)

(58) Field of Classification Search
CPC .......... A45F 2200/05; A45F 2200/0516; A45F 5/022; A45F 5/02; H04B 1/3888; H04B 1/385; A45C 13/002; A45C 13/1069; A45C 2013/025; A45C 2001/086; A45C 2011/002; A41F 1/002
See application file for complete search history.

(56) References Cited

U.S. PATENT DOCUMENTS

| | | | | |
|---|---|---|---|---|
| 7,210,936 B2* | 5/2007 | Moeller | ................. | A45C 11/00 |
| | | | | 434/73 |
| 9,089,170 B2* | 7/2015 | Muratore, II | .......... | A41B 15/02 |
| 9,924,787 B2* | 3/2018 | Jackson | .................. | A45F 5/022 |
| 10,063,086 B2* | 8/2018 | Miller | ..................... | H02J 7/025 |

* cited by examiner

*Primary Examiner* — Nhan T Le

(57) ABSTRACT

For example, a magnetic retention system comprising: (A) a piece of clothing with a pocket with an opening and outer and inner surfaces of a portion of pocket fabric; (B) a tab device comprising material A, the tab device placed near the opening on the outer surface; (C) an electronic device with a viewing screen on a major surface and a cover on an opposing major surface, the cover incorporating or having affixed complementary surface comprising material B, wherein one of materials A and B is magnetic, and the other is magnetically susceptible, and wherein the tab and material B are situated and such that when the electronic device is in the pocket with appropriate orientation there is a strong attraction between materials A and B such that greater force is needed for the electronic device to slip from the pocket.

20 Claims, 3 Drawing Sheets

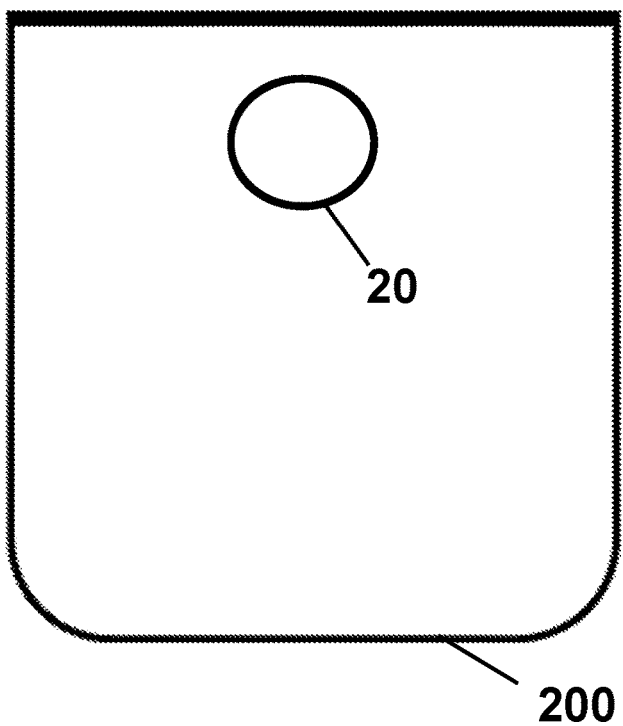
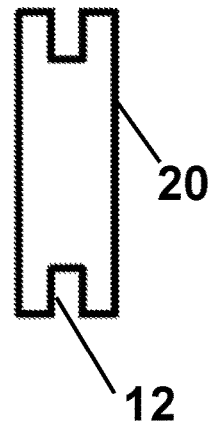
Fig. 1A
Fig. 1B
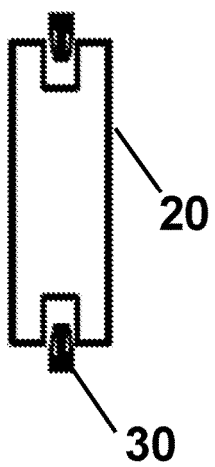
Fig. 1C
Fig. 1D

MAGNETIC POCKET RETAINER

This application is a continuation of U.S. Ser. No. 15/391,770, filed 27 Dec. 2016, which claims the priority of U.S. Ser. No. 62/272,048, filed 28 Dec. 2015, the content of which applications are incorporated herein in their entirety.

The present application relates generally to magnetic devices for conveniently assuring that an electronic device remains retained in a pocket until needed.

Cell phones and like devices are prone to damage when they fall out of breast pockets, for example when the user jogs, or leans over to pick up some item off the floor. Consumers are resistant to using bulky retaining device, such as might clip onto a user's belt. These devices are also often cumbersome to use. Described here is a simple, non-bulky system for retaining the phone, that nonetheless allows easy removal from the pocket.

SUMMARY

In one embodiment, the invention provides a magnetic retention system comprising: (A) a piece of clothing with a pocket with an opening and outer and inner surfaces of a portion of pocket fabric; (B) a tab device comprising material A, the tab device placed near the opening on the outer surface; (C) an electronic device with a viewing screen on a major surface and a cover on an opposing major surface, the cover incorporating or having affixed complementary surface comprising material B, wherein one of materials A and B is magnetic, and the other is magnetically susceptible, and wherein the tab and material B are situated and such that when the electronic device is in the pocket with appropriate orientation there is a strong attraction between materials A and B such that greater force is needed for the electronic device to slip from the pocket (compared to in the absence of the system). The complementary surface can be comprised in a structure that defines a boundary lip that further retards the electronic device from slipping from the pocket. Material A can be magnetic.

Provided is a method of retaining an electronic device in a pocket with an opening and outer and inner surfaces of a portion of pocket fabric, comprising: (1) providing a tab device comprising material A, the tab placed near the opening; (2) placing in the pocket an electronic device with a viewing screen on a major surface and a cover on an opposing major surface, the cover incorporating or having affixed a complementary surface comprising material B, the electronic device placed so that material A is attracted to material B; wherein one of materials A and B is magnetic, and the other is magnetically susceptible, and wherein the tab and material B are situated and such that there is a strong attraction between materials A and B such that greater force is needed for the electronic device to slip from the pocket.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

FIGS. 1A to 1H depict a tab, including as associated with pocket fabric;

Figure 1E:
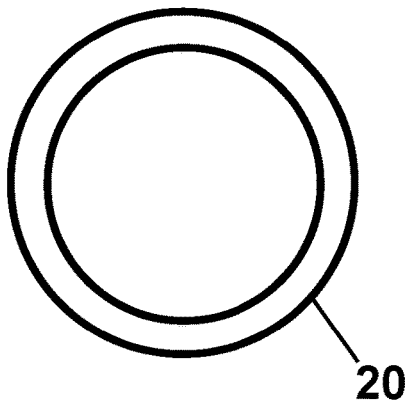

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

FIG. 1A shows a tab 20 placed on fabric 200 from a pocket by its adherence/retention via a retainer. The retainer can be located on the inside of the pocket or the outside. Accordingly, the tab can be visible on the outside of the pocket, or can be located within the pocket. In one embodiment, retaining notch 12 (FIG. 1B) is configured in interact with the retainer. FIG. 1C shows the cross-section of an embodiment of a retainer 30, interacting with the tab 20, forming a tab device 22. FIG. 1D shows an embodiment of a retainer 30 which is a clip, such as a metallic clip.

Figure 2:
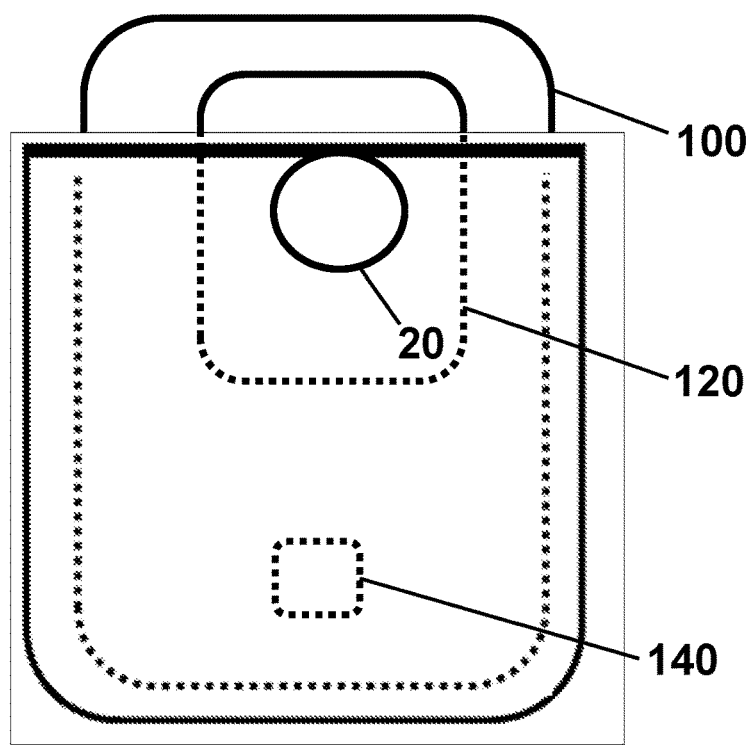
FIG. 2 is the back side of an electronic device, as shown in a pocket.

FIG. 2 shows an electronic device 100 with cameral lens 110 and a structure 120 including material B (defined below). Shown is a side of the electronic device away from that with a view screen (not shown). Illustrated is a pocket 200 with the exemplary system in use.

At least a portion of the tab complex 22 is of material A. Materials A and B are such that one is magnetic, and the other is attracted by a magnet (magnetically susceptible). Materials A and B can both be magnetic, so long as care is taken with the N and S poles so that the materials attract.

Figure 3:
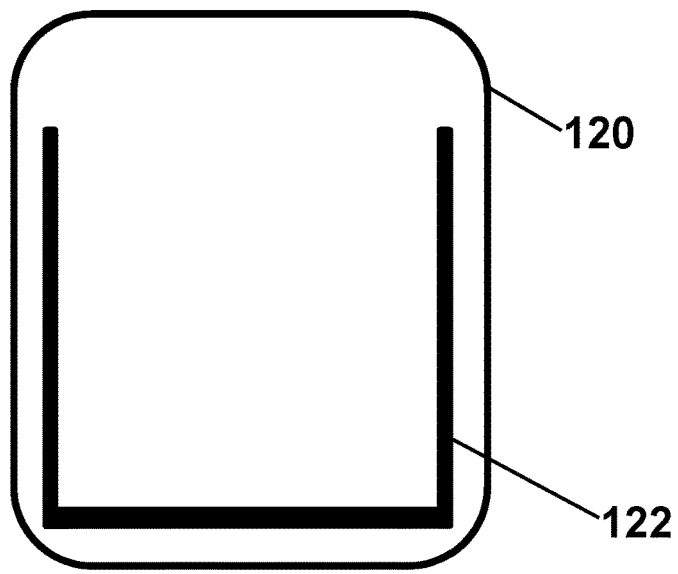
FIG. 3 is a complementary surface comprising material B and having a rim.

FIG. 3 shows a portion of a structure (such as in FIG. 2) with material B with a protruding retaining rim 122. The retaining rim defines a retention zone within its border. The rim act so as to provide further resistance to a tab complex 22 sliding out of the retaining zone. The rim can be wider and/or surround the zone where adhesion to material A will be effected. The rim portion may or may not be of material B.

The tab can be circular, rectangular or any other shape that allows for a useful retaining notch. If for example the tab is rectangular, the notch can manifest in the corners to provide good retention. Note that in this application "notch" is used in the singular, but such a "notch" can manifest in multiple segments of canal.

More than one tab can be used on a pocket. In embodiments, two or more tabs are joined by an exterior (to the pocket) bridging structure, which can be decorative. In embodiments, the exterior of the tab is coated (such as by, without limitation, electroplating) to provide an aesthetic effect.

The retainer can be of a soft material such as nylon. Such a material provides the advantage that it is less likely to scratch the electronic device—especially where the electronic device is by mistake placed in the pocket with the view screen facing the tab. The material should be elastic enough to be stretched over the rim of the notch.

A wire ring, or a plastic coated wire ring can be used, with for example a portion of the wire twisted to tighten it about the tab. The notch can include a portion of greater depth into which the twisted portion can be folded.

In embodiments, the retainer is magnetically attracted to the tab. Such that retainer is on one side of the shirt material, and the tab on the other. If the tab is on the inside, it can for example comprise magnetic material, and attract a magnetically susceptible material with the electronic device. Or, it can be magnetically susceptible and (i) be attracted to magnetic material in the electronic device or (ii) be surrounded by magnetic material in the retainer that attracts both the tab and a magnetically susceptible part of the electronic device.

Figure 1F:
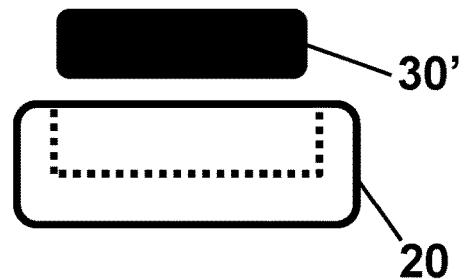

FIGS. 1E and 1F show a fabric side, and side view, of a tab with a hollow into which fits a retainer 30', typically from the other side of the fabric. In embodiments, the retainer 30' is attracted to the tab 20 magnetically.

Where there is a tab or retainer on the interior of a pocket, it can be coated with soft plastic to help protect the electronic device (unless already of a soft material). The tab or retainer can be fully coated, or coated on the side configured to contact the electronic device.

Figure 1G:
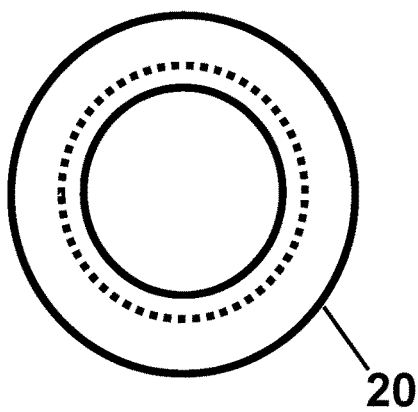
Figure 1H:
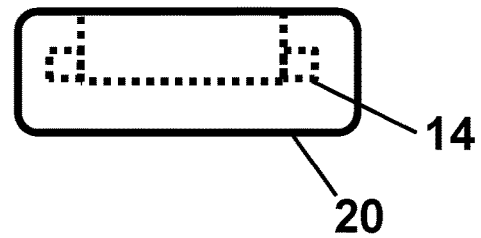

FIGS. 1G and 1H show a fabric side, and side view, of a tab with a hollow into which fits a retainer, and a channel 14 into which the retainer is configured to expand, such as at three points or uniformly. For example, the retainer can include a push button that actuates three or more levers or cams that are for example spring loaded in closed position but can be locked into expanded position. Or, the push button mechanism can for example expand an o-ring into the channel 14. In an embodiment, the retainer has levers or cams (or the like) or an o-ring that snaps into the channel 14 when the retainer is inserted into the hollow. Release (if there is release) can be for example by temporarily deforming the tab to push the retainer out. The magnetic element can be the tab or the retainer.

A metal retainer can be used, for example with a crimping device—such as used to retain PEX piping to connector pieces.

The material A or material B can be a plastic infused with magnetic or magnetically susceptible material.

In an embodiment of the invention, the tab has one or more short pins configured to pierce the fabric of the pocket, and the retainer comprises a device such as a clip for retaining the pin by compression.

In a simple form of the invention, the tab is retained on the outer surface of the pocket by the magnetic attraction to material B. In this form, a single magnet as the tab has been found effective to retain a Samsung S2 phone with over-size battery when dipped to an angle at which the cell phone would otherwise drop out of the pocket.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more. If there are two ranges mentioned, such as about 1 to 10 and about 2 to 5, those of skill will recognize that the implied ranges of 1 to 5 and 2 to 10 are within the invention.

The invention can be further described with reference to the following numbered embodiments:

Embodiment A1. A magnetic retention system comprising: (A) a piece of clothing with a pocket with an opening and outer and inner surfaces of a portion of pocket fabric; (B) a tab device comprising material A, the tab device placed near the opening on the outer surface; (C) an electronic device with a viewing screen on a major surface and a cover on an opposing major surface, the cover incorporating or having affixed complementary surface comprising material B, wherein one of materials A and B is magnetic, and the other is magnetically susceptible, and wherein the tab and material B are situated and such that when the electronic device is in the pocket with appropriate orientation there is a strong attraction between materials A and B such that greater force is needed for the electronic device to slip from the pocket (compared to in the absence of the system).

Embodiment A2. A method of retaining an electronic device in a pocket with an opening and outer and inner surfaces of a portion of pocket fabric, comprising: (1) providing a tab device comprising material A, the tab placed near the opening; (2) placing in the pocket an electronic device with a viewing screen on a major surface and a cover on an opposing major surface, the cover incorporating or having affixed a complementary surface comprising material B, the electronic device placed so that material A is attracted to material B; wherein one of materials A and B is magnetic, and the other is magnetically susceptible, and wherein the tab and material B are situated and such that there is a strong attraction between materials A and B such that greater force is needed for the electronic device to slip from the pocket.

Embodiment A3. The system or method of an "A" Embodiment, wherein the tab is configured to be affixed to the fabric by a retainer operative on the other side of the fabric from the tab.

Embodiment A4. The system or method of an "A" Embodiment, wherein the retainer is configured to have a portion expand to lock into the tab.

Embodiment A5. The system or method of an "A" Embodiment, wherein the retainer is configured to have a portion expand to lock into the tab.

Embodiment A6. The system or method of an "A" Embodiment, wherein the tab comprises a retaining notch, and wherein the system comprises a retainer configured to engage the notch to retain the tab.

Embodiment A7. The system or method of an "A" Embodiment, wherein the complementary surface comprises a boundary lip that further retards the electronic device from slipping from the pocket.

Embodiment A8. The system or method of an "A" Embodiment, wherein material A is magnetic.

Embodiment A9. The system or method of an "A" Embodiment, wherein a portion of the tab device configured for inside the pocket presents a soft surface to the electronic device.

A laminate is a bonding, fusing, adhesion, or the like between polymer layers, or between polymer and fabric layers, such that in the range of anticipated use the laminate is a unitary structure.

Where a sentence states that its subject is found in embodiments, or in certain embodiments, or in the like, it is applicable to any embodiment in which the subject matter can be logically applied.

This invention described herein is of a magnetic pocket retainer and methods of forming the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A magnetic retention system comprising:
    a piece of clothing with a pocket with an opening and outer and inner surfaces of a portion of pocket fabric;
    a tab device comprising material A, the tab device affixed to the portion of pocket fabric; and
    an electronic device with a viewing screen on a major surface and a cover on an opposing major surface, the cover incorporating or having affixed complementary surface comprising material B,
    wherein one of materials A and B is magnetic, and the other is magnetically susceptible, and wherein the tab and material B are situated and such that when the electronic device is in the pocket with appropriate orientation there is a strong attraction between materials A and B such that greater force is needed for the electronic device to slip from the pocket, wherein the tab is configured to be affixed to the fabric by a retainer operative on the other side of the fabric from the tab.

2. The system of claim 1, wherein the material A is magnetic.

3. The system of claim 2, wherein the complementary surface comprises a boundary lip that further retards the electronic device from slipping from the pocket.

4. The system of claim 2, wherein the retainer affixes the tab to the fabric magnetically.

5. The system of claim 4, wherein a surface of the tab is configured to contact the complementary surface and is coated with a soft plastic.

6. The system of claim 1, wherein the tab comprises a retaining notch, and wherein the system comprises
    a retainer configured to engage the notch to retain the tab.

7. The system of claim 1, wherein the complementary surface comprises a boundary lip that further retards the electronic device from slipping from the pocket.

8. The system of claim 1, wherein the retainer affixes the tab to the fabric magnetically.

9. The system of claim 8, wherein the material A is magnetic, the retainer is magnetically susceptible, and the retainer is on the outer surface of the fabric.

10. The system of claim 1, wherein a portion of the tab device or the retainer configured for inside the pocket presents a soft surface to the electronic device.

11. A method of retaining an electronic device in a pocket with an opening and outer and inner surfaces of a portion of pocket fabric, comprising:
    providing a tab device comprising material A, the tab device affixed to the portion of pocket fabric; and
    placing in the pocket an electronic device with a viewing screen on a major surface and a cover on an opposing major surface, the cover incorporating or having affixed a complementary surface comprising material B, the electronic device placed so that material A is attracted to material B;
    wherein one of materials A and B is magnetic, and the other is magnetically susceptible, and wherein the tab and material B are situated and such that there is a strong attraction between materials A and B such that greater force is needed for the electronic device to slip from the pocket, wherein the tab is configured to be affixed to the fabric by a retainer operative on the other side of the fabric from the tab.

12. The method of claim 11, wherein the retainer is configured to have a portion expand to lock into the tab.

13. The method of claim 12, wherein the complementary surface comprises a boundary lip that further retards the electronic device from slipping from the pocket.

14. The method of claim 11, wherein the tab comprises a retaining notch, and wherein the system comprises
    a retainer configured to engage the notch to retain the tab.

15. The method of claim 14, wherein a portion of the tab or retainer configured for inside the pocket presents a soft surface to the electronic device.

16. The method of claim 11, wherein the complementary surface comprises a boundary lip that further retards the electronic device from slipping from the pocket.

17. The method of claim 11, wherein the retainer affixes the tab to the fabric magnetically.

18. The method of claim 17, wherein the material A is magnetic, the retainer is magnetically susceptible, and the retainer is on the outer surface of the fabric.

19. The method of claim 18, wherein a surface of the tab or retainer configured to contact the complementary surface is coated with a soft plastic.

20. The method of claim 11, wherein a surface of the tab or retainer configured to contact the complementary surface is coated with a soft plastic.

* * * * *